United States Patent
Matsumoto et al.

(10) Patent No.: US 12,202,948 B2
(45) Date of Patent: Jan. 21, 2025

(54) FIBER-REINFORCED RESIN MATERIAL, WOUND BODY, MOLDED ARTICLE, AND PRODUCTION METHOD FOR FIBER-REINFORCED RESIN MATERIAL

(71) Applicant: Mitsubishi Gas Chemical Company, Inc., Tokyo (JP)

(72) Inventors: Nobuhiko Matsumoto, Hiratsuka (JP); Takafumi Oda, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 723 days.

(21) Appl. No.: 17/434,343

(22) PCT Filed: Dec. 27, 2019

(86) PCT No.: PCT/JP2019/051416
§ 371 (c)(1),
(2) Date: Aug. 26, 2021

(87) PCT Pub. No.: WO2020/174871
PCT Pub. Date: Sep. 3, 2020

(65) Prior Publication Data
US 2022/0153944 A1 May 19, 2022

(30) Foreign Application Priority Data
Feb. 28, 2019 (JP) .................. 2019-035458

(51) Int. Cl.
C08J 5/04 (2006.01)
B32B 27/34 (2006.01)
C08J 5/18 (2006.01)
C08J 5/24 (2006.01)
C08L 77/06 (2006.01)

(52) U.S. Cl.
CPC .............. *C08J 5/243* (2021.05); *C08J 5/244* (2021.05); *C08J 2377/02* (2013.01)

(58) Field of Classification Search
CPC ..... C08J 5/04; C08J 5/18; B32B 27/34; C08L 77/06
USPC ................ 428/297.4, 298.1, 474.4
See application file for complete search history.

(56) References Cited

U.S. PATENT DOCUMENTS

| | | | |
|---|---|---|---|
| 2009/0280311 A1* | 11/2009 | Kumazawa | C08L 77/00 524/451 |
| 2010/0304164 A1* | 12/2010 | Sato | B29C 45/1684 525/66 |
| 2013/0115836 A1 | 5/2013 | Touraud et al. | |
| 2016/0009881 A1 | 1/2016 | Fujita et al. | |
| 2017/0037185 A1 | 2/2017 | Briffaud et al. | |
| 2017/0313879 A1 | 11/2017 | Kobayashi et al. | |
| 2019/0300661 A1 | 10/2019 | Matsumoto et al. | |

FOREIGN PATENT DOCUMENTS

| | | | | |
|---|---|---|---|---|
| JP | 2011-102360 A | | 5/2011 | |
| JP | 2016194023 A | * | 11/2016 | ............... C08J 5/04 |
| JP | 2016-216661 A | | 12/2016 | |
| JP | 2017-511420 A | | 4/2017 | |
| JP | 2017066255 A | * | 4/2017 | ............... C08J 5/04 |
| JP | 2019-026686 A | | 2/2019 | |
| KR | 1020170086543 A | | 7/2017 | |
| WO | 2014/084194 A1 | | 6/2014 | |
| WO | 2017/203893 A1 | | 11/2017 | |

OTHER PUBLICATIONS

Machine translation of JP-2016194023-A (no date).*
Machine translation of JP-2017066255-A (no date).*
International Preliminary Report on Patentability and Written Opinion for PCT/JP2019/051416, mailed Mar. 17, 2020, and English Translation submitted herewith (18 pages).
International Search Report for PCT/JP2019/051416, mailed Mar. 17, 2020, and English Translation submitted herewith (7 pages).
Office Action issued in Korean Patent Application No. 10-2021-7028905; issued Jul. 29, 2024; 9 pages.

* cited by examiner

*Primary Examiner* — Michael J Feely
(74) *Attorney, Agent, or Firm* — Fitch, Even, Tabin & Flannery LLP

(57) ABSTRACT

Provided is a fiber-reinforced resin material in which is used a polyamide resin such as MXD6 that is appropriately impregnated into continuous reinforcing fibers and has suppressed perforations and deficits when formed into a film in a molten state. Also provided are a wound body, a molded article, and a method for producing the fiber-reinforced resin material. The film-shaped fiber-reinforced resin material has a polyamide resin composition that is impregnated into continuous reinforcing fibers arranged in parallel in at least one direction. The polyamide resin composition contains a polyamide resin (A) and a polyamide resin (B) other than the polyamide resin (A), and the polyamide resin (A) is constituted from a constituent unit derived from a diamine and a constituent unit derived from a dicarboxylic acid, 70 mol % or greater of the constituent units derived from a diamine are derived from meta-xylylenediamine, and 70 mol % or greater of the constituent units derived from a dicarboxylic acid are derived from adipic acid. A melt tension of the polyamide resin composition is 1 mN or greater, and a melt viscosity is 250 Pa·s or greater.

15 Claims, 1 Drawing Sheet

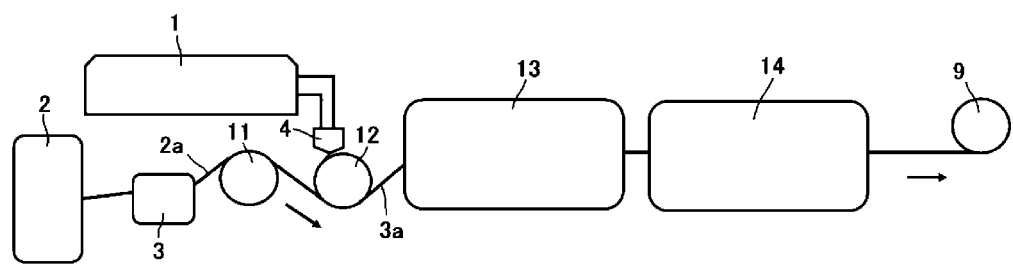

FIBER-REINFORCED RESIN MATERIAL, WOUND BODY, MOLDED ARTICLE, AND PRODUCTION METHOD FOR FIBER-REINFORCED RESIN MATERIAL

CROSS-REFERENCE TO RELATED APPLICATIONS

This application is a U.S. national phase application filed under 35 U.S.C. § 371 of International Application Number PCT/JP2019/051416, filed Dec. 27, 2019, designating the United States, which claims priority from Japanese Application Number 2019-035458, filed Feb. 28, 2019.

FIELD OF THE INVENTION

The present invention relates to a fiber-reinforced resin material, a wound body, a molded article, and a method for producing the fiber-reinforced resin material. In particular, the present invention relates to a fiber-reinforced resin material in which a polyamide resin is used.

BACKGROUND OF THE INVENTION

Conventionally, polyamide MXD6 (poly(meta-xylylene adipamide)) synthesized from meta-xylylenediamine and adipic acid has been used. MXD6 has features such as higher mechanical strength, higher elastic modulus, and lower water absorption compared to polyamide 6 and polyamide 66, which are aliphatic polyamide resins. Further, MXD6 exhibits extremely high strength and rigidity by being reinforced with materials such as glass fibers or inorganic fillers, and thus MXD6 is able to meet the demands in various fields.

Patent Document 1 discloses a method for producing a fiber-reinforced resin material by sandwiching and hot pressing a polyamide resin such as MXD6 and long fibers between a first metal foil and a second metal foil, and after the hot pressing, detaching the first metal foil and the second metal foil, wherein the first metal foil has a composition containing from 1 to 30 parts by weight of a silicon atom-containing compound per 100 parts by weight of an epoxy resin on a surface of a side contacting the polyamide resin or long fibers.

CITATION LIST

Patent Documents

Patent Document 1: JP 2017-066255 A

SUMMARY OF INVENTION

Through the method described in Patent Document 1, the impregnability of MXD6 into the long fibers (continuous reinforcing fibers) becomes favorable, but a demand exists for a method besides hot pressing to impregnate MXD6 into continuous reinforcing fibers.

The present inventors conducted examinations from this perspective, and as a result of that examination, in order to impregnate MXD6 into continuous reinforcing fibers, the inventors attempted to melt-extrude the MXD6 into a film shape, apply the film-shaped MXD6 to a roving of continuous reinforcing fibers that had been opened, and thereby impregnate the MXD6 into the continuous reinforcing fibers. However, the inventors found that the film formability of the molten film of MXD6 is not stable. Specifically, the MXD6 could not be uniformly applied to the entire surface of the continuous reinforcing fibers because portions of the film-shaped MXD6 were missing, or perforations were formed therein. On the other hand, when an attempt is made to improve the film formability of the molten film of MXD6, the impregnability into the continuous reinforcing fibers may become inferior.

Thus, an object of the present invention is to solve the problems described above, and more specifically, an object of the present invention is to provide a fiber-reinforced resin material in which is used a polyamide resin such as MXD6 that is appropriately impregnated into continuous reinforcing fibers and has suppressed perforations or deficits when formed into a film in a molten state, and to provide a wound body, a molded article, and a method for producing the fiber-reinforced resin material.

On the basis of an awareness of the problems described above, the present inventors discovered that when a fiber-reinforced resin material is to be produced, the problems described above can be solved by blending another polyamide resin into a polyamide resin such as MXD6, and adjusting the melt tension and melt viscosity of the polyamide resin component that is melt-extruded. Specifically, the above problems have been solved by the following means.

<1> A film-shaped fiber-reinforced resin material in which a polyamide resin composition is impregnated into continuous reinforcing fibers arranged in parallel in at least one direction, wherein
the polyamide resin composition contains a polyamide resin (A) and a polyamide resin (B) other than the polyamide resin (A), and the polyamide resin (A) is constituted from a constituent unit derived from a diamine and a constituent unit derived from a dicarboxylic acid, 70 mol % or greater of the constituent units derived from a diamine are derived from meta-xylylenediamine, and 70 mol % or greater of the constituent units derived from a dicarboxylic acid are derived from adipic acid;
a melt tension measured using a capillograph of the polyamide resin composition contained in the fiber-reinforced resin material under conditions including using a die having a diameter of 1 mm and a length of 10 mm, a cylinder temperature set to a temperature X, a preheating time of 6 minutes, a piston speed of 5 mm/min, and a drawing speed of 100 m/min is 1 mN or greater, and a melt viscosity at the temperature X, a shear rate of 122 sec$^{-1}$, and a holding time of 6 minutes is 250 Pa·s or greater; and
the temperature X is 20° C. higher than the melting point of the polyamide resin with the highest melting point from among polyamide resins contained in the polyamide resin composition, provided that when at least one of the polyamide resins is an amorphous polyamide resin, the temperature X is the higher of 270° C. or said melting point+20° C.

<2> The fiber-reinforced resin material according to <1>, wherein the melt viscosity at a temperature Y of the polyamide resin (B), a shear rate of 122 sec$^{-1}$, and a holding time of 6 minutes is from 250 to 800 Pa·s, and the temperature Y is 20° C. higher than the melting point of the polyamide resin, provided that, when the polyamide resin is an amorphous polyamide resin, then 270° C.

<3> The fiber-reinforced resin material according to <1> or <2>, wherein a melt tension measured using a capillograph of the polyamide resin (B) under conditions including using a die having a diameter of 1 mm and a length of 10 mm, a cylinder temperature set to the temperature Y, a preheating time of 6 minutes, a piston speed of 5 mm/min, and a drawing speed of 100 m/min is from 1 to 20 mN, and the temperature Y is 20° C. higher than the melting point of the polyamide resin, provided that, when the polyamide resin is an amorphous polyamide resin, then 270° C.

<4> The fiber-reinforced resin material according to any one of <1> to <3>, wherein the polyamide resin (B) is a semi-aromatic polyamide resin.

<5> The fiber-reinforced resin material according to any one of <1> to <4>, wherein the polyamide resin (B) is constituted from a constituent unit derived from a diamine and a constituent unit derived from a dicarboxylic acid, and of the constituent units derived from a diamine, from 50 mol % to 100 mol % are derived from meta-xylylenediamine and from 0 mol % to 50 mol % are derived from para-xylylenediamine, and 70 mol % or greater of the constituent units derived from a dicarboxylic acid are derived from sebacic acid.

<6> The fiber-reinforced resin material according to any one of <1> to <5>, wherein the continuous reinforcing fibers include glass fibers and/or carbon fibers.

<7> The fiber-reinforced resin material according to any one of <1> to <6>, wherein the melt viscosity of the polyamide resin composition is 400 Pa·s or less.

<8> The fiber-reinforced resin material according to any one of <1> to <7>, wherein the material is a prepreg.

<9> The fiber-reinforced resin material according to any one of <1> to <7>, wherein the material is a unidirection (UD) tape.

<10> The fiber-reinforced resin material according to any one of <1> to <9>, wherein the continuous reinforcing fibers are arranged in parallel in one direction.

<11> A wound body having a core material and the fiber-reinforced resin material described in any one of <1> to <10> wound onto the core material.

<12> A molded article formed from the fiber-reinforced resin material described in any one of <1> to <10>.

<13> A method for producing a fiber-reinforced resin material, the method including melt-extruding a polyamide resin composition into a film-shape, applying the film-shaped polyamide resin composition to continuous reinforcing fibers arranged in parallel in at least one direction, and impregnating the polyamide resin composition into the continuous reinforcing fibers; wherein the polyamide resin composition contains a polyamide resin (A) and a polyamide resin (B) other than the polyamide resin (A), and the polyamide resin (A) is constituted from a constituent unit derived from a diamine and a constituent unit derived from a dicarboxylic acid, 70 mol % or greater of the constituent units derived from a diamine are derived from meta-xylylenediamine, and 70 mol % or greater of the constituent units derived from a dicarboxylic acid are derived from adipic acid;

a melt tension measured using a capillograph of the polyamide resin composition during melt-extrusion, under conditions including using a die having a diameter of 1 mm and a length of 10 mm, a cylinder temperature set to a temperature X, a preheating time of 6 minutes, a piston speed of 5 mm/min, and a drawing speed of 100 m/min is 1 mN or greater, and a melt viscosity at the temperature X, a shear rate of 122 sec$^{-1}$, and a holding time of 6 minutes is 250 Pa·s or greater; and the temperature X is 20° C. higher than the melting point of the polyamide resin with the highest melting point from among polyamide resins contained in the polyamide resin composition, provided that when at least one of the polyamide resins is an amorphous polyamide resin, the temperature X is the higher of 270° C. or said melting point+20° C.

<14> The method for producing a fiber-reinforced resin material according to <13>, wherein the polyamide resin (B) is a semi-aromatic polyamide resin.

<15> The method for producing a fiber-reinforced resin material according to <13> or <14>, wherein the polyamide resin (B) is constituted from a constituent unit derived from a diamine and a constituent unit derived from a dicarboxylic acid, and of the constituent units derived from a diamine, from 50 mol % to 100 mol % are derived from meta-xylylenediamine and from 0 mol % to 50 mol % are derived from para-xylylenediamine, and 70 mol % or greater of the constituent units derived from a dicarboxylic acid are derived from sebacic acid.

<16> The method for producing a fiber-reinforced resin material according to any one of <13> to <15>, wherein the continuous reinforcing fibers are arranged in parallel in one direction.

<17> The method for producing a fiber-reinforced resin material according to <16>, wherein the continuous reinforcing fibers arranged in parallel in one direction are opened continuous reinforcing fiber rovings.

<18> The method for producing a fiber-reinforced resin material according to any one of <13> to <17>, the method including applying the film-shaped polyamide resin composition onto the continuous reinforcing fibers and impregnating the polyamide resin composition into the continuous reinforcing fibers using a roll.

<19> The method for producing a fiber-reinforced resin material according to any one of <13> to <18>, wherein the melt viscosity of the polyamide resin composition is 400 Pa·s or less.

According to the present invention, a fiber-reinforced resin material in which is used a polyamide resin such as MXD6 that is appropriately impregnated into continuous reinforcing fibers and has suppressed perforations and deficits when formed into a film in a molten state, and also a wound body, a molded article, and a method for producing the fiber-reinforced resin material can be provided.

BRIEF DESCRIPTION OF DRAWINGS

FIG. 1 is a device configurational diagram schematically illustrating a device for producing a fiber-reinforced resin material according to a preferred embodiment of the present invention.

DESCRIPTION OF EMBODIMENTS

Contents of the present invention will be described in detail below. In the present specification, "from . . . to . . . " or "of . . . to . . . " is used to mean that the numerical values described before and after "to" are included as the lower limit and the upper limit, respectively.

The term amorphous resin in the present invention refers to a resin having a crystalline melting enthalpy ΔHm of less than 5 J/g.

The fiber-reinforced resin material of the present invention is characterized by being a film-shaped fiber-reinforced resin material in which a polyamide resin composition is impregnated into continuous reinforcing fibers arranged in parallel in at least one direction, wherein the polyamide resin composition contains a polyamide resin (A) and a polyamide resin (B) other than the polyamide resin (A), and the polyamide resin (A) is constituted from a constituent unit derived from a diamine and a constituent unit derived from a dicarboxylic acid, 70 mol % or greater of the constituent units derived from a diamine are derived from meta-xylylenediamine, and 70 mol % or greater of the constituent units derived from a dicarboxylic acid are derived from adipic acid; a melt tension measured using a capillograph of the polyamide resin composition contained in the fiber-reinforced resin material under conditions including using a die having a diameter of 1 mm and a length of 10 mm, a cylinder temperature set to a temperature X, a preheating time of 6 minutes, a piston speed of 5 mm/min, and a drawing speed of 100 m/min is 1 mN or greater, and a melt viscosity at the temperature X, a shear rate of 122 $sec^{-1}$, and a holding time of 6 minutes is 250 Pa·s or greater; and the temperature X is 20° C. higher than the melting point of the polyamide resin with the highest melting point from among polyamide resins contained in the polyamide resin composition, provided that when at least one of the polyamide resins is an amorphous polyamide resin, the temperature X is the higher of 270° C. or said melting point+20° C.

Here, the melt tension and melt viscosity of the polyamide resin composition contained in the fiber-reinforced resin material are values measured for a polyamide resin composition that has been solvent-extracted from a fiber-reinforced resin material. More specifically, the melt tension and melt viscosity are measured in accordance with the method described in the examples below.

Such a constitution makes it easier for the polyamide resin composition to spread over the entire surface of the continuous reinforcing resin fibers arranged in parallel in one direction. That is, a polyamide resin composition containing a film-shaped MXD6 in a molten state with suppressed perforations and deficits can be applied to the entire surface of the continuous reinforcing fibers, and impregnation of the polyamide resin composition into the continuous reinforcing fibers can also be increased.

Furthermore, a fiber-reinforced resin material that maintains the water absorption resistance and mechanical properties inherent in the polyamide resin (A) is obtained.

In the present specification, the "temperature X" is a reference temperature for determining the melt viscosity, the melt tension, and the like of the polyamide resin composition, and means a temperature that is 20° C. higher than the melting point of the polyamide resin with the highest melting point from among polyamide resins contained in the polyamide resin composition, that is, the melting point+20° C. (however, for a case in which at least one of the polyamide resins is an amorphous polyamide resin, then the higher of 270° C. or the melting point+20° C.).

Furthermore, the "temperature Y" is a reference temperature for determining the melt viscosity and melt tension of the polyamide resins (A) and (B) contained in the polyamide resin composition, and is 20° C. higher than the melting point of the polyamide resins, that is the melting point+20° C. (however, in case where the polyamide resins are amorphous polyamide resins, then 270° C.).

When the polyamide resin composition contains two or more types of polyamide resins (A), the melt viscosity or melt tension of the polyamide resin (A) refers to the melt viscosity or the melt tension of the polyamide resin having the highest content. The same applies to the polyamide resin (B).

Polyamide Resin Composition

In the polyamide resin composition used in the present invention, the melt tension is 1 mN or greater, preferably 1.2 mN or greater, more preferably 1.4 mN or greater, and even more preferably 1.6 mN or greater. The upper limit is preferably 25 mN or less, more preferably 10 mN or less, even more preferably 9 mN or less, yet even more preferably 8 mN or less, and still even more preferably 3 mN or less. By setting the melt tension to be the above lower limit or greater, the polyamide resin composition can be formed into a molten film in which perforations and deficits are suppressed. Furthermore, by setting the melt tension to be the above upper limit or less, a film in a molten state can be more readily extruded.

The polyamide resin (A) that is used is usually one for which the melt tension cannot be measured by the method described in the examples below for reasons such as the resin running out. However, in the present invention, the melt tension of the polyamide resin composition is adjusted by blending the polyamide resin (B) into this type of polyamide resin (A).

The melt tension is measured in accordance with a method described in the examples below.

The melt viscosity of the polyamide resin composition is 250 Pa·s or greater, and preferably 260 Pa·s or greater. The upper limit is preferably 400 Pa·s or less, more preferably 380 Pa·s or less, even more preferably 350 Pa·s or less, and yet even more preferably 320 Pa·s or less. By setting the melt viscosity to be the above lower limit or greater, perforations and deficits in the polyamide resin composition can be suppressed. Furthermore, by setting the melt viscosity to be the above upper limit or less, the impregnability of the polyamide resin composition into the continuous reinforcing fibers is improved.

In the present specification, the melt viscosity is measured by a method described in the examples below.

Polyamide Resin (A)

The polyamide resin (A) is constituted from a constituent unit derived from a diamine and a constituent unit derived from a dicarboxylic acid, 70 mol % or greater of the constituent units derived from a diamine are derived from meta-xylylenediamine, and 70 mol % or greater of the constituent units derived from a dicarboxylic acid are derived from adipic acid.

The polyamide resin (A) is typically a crystalline resin, but may be an amorphous resin.

Of the constituent units derived from a diamine, 70 mol % or greater, preferably 80 mol % or greater, more preferably 85 mol % or greater, even more preferably 90 mol % or greater, yet even more preferably 95 mol % or greater, and still even more preferably 97 mol % or greater are derived from meta-xylylenediamine. The upper limit value is not particularly limited, and 100 mol % may be constituent units derived from meta-xylylenediamine.

Examples of diamines besides the meta-xylylenediamine that can be used as raw material diamine components of the polyamide resin (A) include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as para-xylylenediamine, bis(4-aminophenyl)ether, p-phenylenediamine, and bis(aminomethyl)naphthalene. One type thereof can be used, or two or more types can be mixed and used.

In the polyamide resin (A) of the present invention, of the constituent units derived from a dicarboxylic acid amine, 70 mol % or greater, preferably 80 mol % or greater, more preferably 85 mol % or greater, even more preferably 90 mol % or greater, yet even more preferably 95 mol % or greater, and still even more preferably 97 mol % or greater are derived from adipic acid. The upper limit is not particularly limited, and 100 mol % may be components derived from adipic acid.

Examples of the raw material dicarboxylic acid component, other than adipic acid, of the polyamide resin (A) include α,ω-linear aliphatic dicarboxylic acids having from 4 to 20 carbons, other than adipic acid. Specific examples thereof include aliphatic dicarboxylic acids such as succinic acid, glutaric acid, pimelic acid, suberic acid, azelaic acid, sebacic acid, undecanedioic acid, and dodecanedioic acid, and one type thereof can be used, or two or more types can be mixed and used.

The polyamide resin (A) used in the present invention is constituted by, as main components, a constituent unit derived from a diamine and a constituent unit derived from a dicarboxylic acid, but constituent units other than these are not entirely excluded, and the polyamide resin (A) may contain a constituent unit derived from a lactam such as ε-caprolactam or laurolactam, or from an aliphatic aminocarboxylic acid such as aminocaproic acid and aminoundecanoic acid. Here, the term "main component" indicates that, of the constituent units constituting the polyamide resin, the total number of the constituent units derived from a diamine and the constituent units derived from a dicarboxylic acid is the largest among all the constituent units. In the present invention, the total of the constituent units derived from a diamine and the constituent units derived from a dicarboxylic acid in the polyamide resin preferably accounts for 90 mass % or more and more preferably 95 mass % or more of all the constituent units.

The lower limit of the number average molecular weight (Mn) of the polyamide resin (A) is preferably 6000 or greater, more preferably 8000 or greater, and even more preferably 10000 or greater. The upper limit of the above Mn is preferably 100000 or less, more preferably 70000 or less, and even more preferably 50000 or less.

The melt viscosity of the polyamide resin (A) is preferably 100 Pa·s or greater, more preferably 120 Pa·s or greater, and even more preferably 140 Pa·s or greater. The upper limit is preferably 400 Pa·s or less, more preferably 380 Pa·s or less, even more preferably 350 Pa·s or less, and yet even more preferably 300 Pa·s or less. The melt viscosity is measured in accordance with a method described in the examples below.

If the polyamide resin (A) is a crystalline resin, the melting point thereof is preferably 100° C. or higher, more preferably 150° C. or higher, and even more preferably 190° C. or higher. The upper limit is preferably 350° C. or lower, more preferably 330° C. or less, and even more preferably 310° C. or lower.

Polyamide Resin (B)

The polyamide resin (B) is not particularly limited as long as it is a polyamide resin other than the polyamide resin (A). In the polyamide resin (B) used in the present invention, the proportion of the constituent units derived from adipic acid is, with respect to all constituent units, preferably 10 mol % or less, more preferably 5 mol % or less, even more preferably 3 mol % or less, and yet even more preferably 1 mol % or less.

The polyamide resin (B) may be a crystalline resin or an amorphous resin.

The polyamide resin (B) is preferably a semi-aromatic polyamide resin.

The semi-aromatic polyamide resin refers to a polyamide resin constituted from a constituent unit derived from a diamine and a constituent unit derived from a dicarboxylic acid, in which from 20 to 80 mol % (preferably from 30 to 70 mol %) of the total constituent units of the constituent units derived from a diamine and the constituent units derived from a dicarboxylic acid are constituent units containing an aromatic ring. By using such a semi-aromatic polyamide resin, the mechanical strength of the obtained molded body can be increased. Examples of the semi-aromatic polyamide resin include polyamide 6I, 6T, 6T/6I, 6/6T, 66/6T, 66/6T/6I, 9T, 10T, MXD10, MP10, PXD10, polytrimethyl hexamethylene terephthalamide, and polyundecamethylene hexahydroterephthalamide; and 6I, 6T, 6T/6I, 6/6T, 66/6T, 66/6T/6I, MXD10, and MP10 are preferable, 6I, 6T, 6T/6I, 6/6T, 66/6T, 66/6T/6I, MXD10, and MP10 are more preferable, MXD10 and MP10 are even more preferable, and MP10 is yet even more preferable. Note that "I" denotes an isophthalic acid component and "T" denotes a terephthalic acid component. Furthermore, polyamide 6I is a polyamide resin constituted from hexamethylene diamine and isophthalic acid, but may also contain constituent units derived from other monomers within a range that does not depart from the spirit of the present invention (for example, within a range of 10 mass % or less, and particularly 5 mass % or less of all the constituent units). The same applies to the other polyamide resins.

The polyamide resin (B) is constituted from a constituent unit derived from a diamine and a constituent unit derived from a dicarboxylic acid, and of the constituent units derived from a diamine, from 50 mol % to 100 mol % are derived from meta-xylylenediamine and from 0 mol % to 50 mol % are derived from para-xylylenediamine, and 70 mol % or greater of the constituent units derived from a dicarboxylic acid are derived from sebacic acid.

The constituent unit derived from a diamine preferably contains both a constituent unit derived from a meta-xylylenediamine and a constituent unit derived from a para-xylylenediamine.

The constituent unit derived from a meta-xylylenediamine is contained at an amount of preferably 1 mol % or greater, more preferably 20 mol % or greater, even more preferably 40 mol % or greater, yet even more preferably 50 mol % or greater, and still even more preferably 60 mol % or greater. The upper limit is preferably 100 mol % or less, more preferably 99 mol % or less, even more preferably 90 mol % or less, and yet even more preferably 80 mol % or less.

The constituent unit derived from a para-xylylenediamine is contained at an amount of preferably 0 mol % or greater, more preferably 1 mol % or greater, even more preferably 10 mol % or greater, and yet even more preferably 20 mol % or greater. The upper limit is preferably 99 mol % or less, more preferably 80 mol % or less, even more preferably 60 mol % or less, still more preferably 50 mol % or less, and yet even more preferably 40 mol % or less.

Note that in the constituent units derived from a diamine, the total of the constituent units derived from meta-xylylenediamine and the constituent units derived from the para-xylylenediamine is 100 mol % or less, but is preferably 100 mol %.

Examples of diamines besides xylylenediamine that can be used as raw material diamine components of the polyamide resin (B) include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as bis(4-aminophenyl)ether, p-phenylenediamine, and bis(aminomethyl)naphthalene. One type thereof can be used, or two or more types can be mixed and used.

In the polyamide resin (B), 70 mol % or greater of the constituent units derived from a dicarboxylic acid are preferably derived from sebacic acid, and the proportion thereof is more preferably 80 mol % or greater, even more preferably 90 mol % or greater, and yet even more preferably 95 mol % or greater. The upper limit value is not particularly limited and may be 100 mol %.

Examples of the raw material dicarboxylic acid component, other than sebacic acid, of the polyamide resin (B) include α,ω-linear aliphatic dicarboxylic acids having from 4 to 20 carbons, other than sebacic acid. Specific examples thereof include aliphatic dicarboxylic acids such as succinic acid, glutaric acid, adipic acid, pimelic acid, suberic acid, azelaic acid, undecanedioic acid, and dodecanedioic acid, and one type thereof can be used, or two or more types can be mixed and used.

Examples of the dicarboxylic acid component other than sebacic acid include phthalic acid compounds such as isophthalic acid, terephthalic acid, and orthophthalic acid, and dicarboxylic acids having an aromatic ring group such as naphthalene dicarboxylic acid, and one type thereof can be used, or two or more types can be mixed and used.

Note that the polyamide resin (B) used in the present invention is constituted by, as main components, a constituent unit derived from a diamine and a constituent unit derived from a dicarboxylic acid, but constituent units other than these are not entirely excluded, and of course, the polyamide resin (B) may contain a constituent unit derived from a lactam such as ε-caprolactam or laurolactam, or from an aliphatic aminocarboxylic acid such as aminocaproic acid and aminoundecanoic acid. Here, the term "main component" indicates that, of the constituent units constituting the polyamide resin, the total number of the constituent units derived from a diamine and the constituent units derived from a dicarboxylic acid is the largest among all the constituent units. In the present invention, the total of the constituent units derived from a diamine and the constituent units derived from a dicarboxylic acid in the polyamide resin preferably accounts for 90 mass % or greater and more preferably 95 mass % or greater of all the constituent units.

The lower limit of the number average molecular weight (Mn) of the polyamide resin (B) is preferably 6000 or greater, more preferably 8000 or greater, and even more preferably 10000 or greater. The upper limit of the above Mn is preferably 100000 or less, more preferably 70000 or less, and even more preferably 50000 or less.

The melt tension of the polyamide resin (B) is preferably 1 mN or greater, more preferably 3 mN or greater, and even more preferably 4 mN or greater. The upper limit is preferably 20 mN or less, more preferably 10 mN or less, and even more preferably 8 mN or less. The melt tension is measured in accordance with a method described in the examples below.

The melt viscosity of the polyamide resin (B) is preferably 250 Pa·s or greater, more preferably 300 Pa·s or greater, even more preferably 350 Pa·s or greater, and still more preferably 400 Pa·s or greater. The upper limit is preferably 800 Pa·s or less, more preferably 600 Pa·s or less, and even more preferably 550 Pa·s or less. The melt viscosity is measured in accordance with a method described in the examples below.

If the polyamide resin (B) is a crystalline resin, the melting point thereof is preferably 190° C. or higher, and more preferably 200° C. or higher. The upper limit is preferably 350° C. or less, more preferably 330° C. or less, and even more preferably 310° C. or less.

<<Blending>>

The ratio at which the polyamide resin (A) and the polyamide resin (B) are combined is not particularly limited, but the amount of the polyamide resin (B) is preferably 1 part by mass or greater, more preferably 2 parts by mass or greater, and even more preferably 5 parts by mass or greater per 100 parts by mass of the polyamide resin (A). The upper limit is preferably 1200 parts by mass or less, more preferably 500 parts by mass or less, even more preferably less than 100 parts by mass, still more preferably 40 parts by mass or less, yet even more preferably 30 parts by mass or less, still even more preferably 20 parts by mass or less, and particularly preferably 15 parts by mass or less. The film formability of the polyamide resin composition is improved by setting the amount of the polyamide resin (B) to be 1 part by mass or greater, and the mechanical strength of the obtained fiber-reinforced resin material and of a molded article obtained from the fiber-reinforced resin material can be further improved by setting the amount of the polyamide resin (B) to 1200 parts by mass or less.

The polyamide resin composition may contain one type of the polyamide resin (A) and one type of the polyamide resin (B), or may contain two or more types of each.

The present invention is effective when the difference between the melt viscosity of the polyamide resin (A) and the melt viscosity of the polyamide resin (B) is large, and the absolute value of the difference thereof is more preferably 100 Pa·s or greater, and even more preferably 150 Pa·s or greater. When the upper limit value is, for example, 400 Pa·s or less, the value with regard to use of the present invention is high.

The difference between the melting point of the polyamide resin (A) and the melting point of the polyamide resin (B) is preferably small, and the absolute value of the difference thereof is more preferably 100° C. or lower, even more preferably 70° C. or lower, yet even more preferably 50° C. or lower, and still even more preferably 30° C. or lower. The lower limit of the abovementioned difference in melting points is ideally 0, but may be 1° C. or higher.

When the content of the resin component in the polyamide resin composition is 100 parts by mass, the total amount of the polyamide resin (A) and the polyamide resin (B) is preferably 90 parts by mass or greater, more preferably 95 parts by mass or greater, and even more preferably 97 parts by mass or greater. A practical upper limit is 99 parts by mass or less.

The total amount of the polyamide resin (A) and the polyamide resin (B) in the polyamide resin composition is preferably 90 mass % or greater of the composition, and more preferably 95 mass % or greater of the composition. The upper limit is preferably 100 mass % or less and may be 99 mass % or less.

<<Other Components (C)>>

The abovementioned polyamide resin composition may contain, in addition to the abovementioned components, a thermoplastic resin and various additives. Examples of the additives include nucleating agents, catalysts, polymerization initiators, curing accelerators, flame retardants, ultraviolet absorbers, impact improving agents, antioxidants, photopolymerization initiators, fluorescent whitening agents, photosensitizers, dyes, pigments, thickeners, flow control agents, lubricants, defoaming agents, dispersants, leveling agents, brighteners, and polymerization inhibitors. One type of these additives may be used alone, or two or more types may be used in combination.

In the present invention, the melt viscosity and the melt tension can be adjusted by the blending form of the polyamide resin composition, and therefore the present invention can be constituted so as to be substantially free of an impact resistance improving agent, softening modifier, and fluidity modifier. Substantially free means that the total of the impact resistance improving agent and the flow control agent is 0.1 mass % or less of the resin composition, and may be 0.01 mass % or less, and is more preferably 0.001 mass % or less.

A fatty acid metal salt can be used as the lubricant, and examples thereof include sodium stearate and calcium stearate. The amount of the lubricant is preferably from 1 to 200 mass ppm per 100 parts by mass of the polyamide resin composition.

The mass ratio of the polyamide resin composition in the fiber-reinforced resin material of the present invention is preferably 40 mass % or greater and more preferably 50 mass % or greater. The upper limit value is preferably 80 mass % or less, and more preferably 70 mass % or less.

<Continuous Reinforcing Fibers>

The continuous reinforcing fibers are not particularly limited, and continuous reinforcing fibers that can be used in this type of technology can be appropriately selected and used. Examples thereof include plant fibers, carbon fibers, glass fibers, alumina fibers, boron fibers, ceramic fibers, and aramid fibers, and the fibers are preferably selected from carbon fibers and glass fibers.

As carbon fibers, known carbon fibers can be widely adopted, and for example, polyacrylonitrile-based carbon fibers or pitch-based carbon fibers can be preferably used. Additionally, carbon fibers of plant-derived raw materials, such as lignin and cellulose, can also be used.

As the glass fibers, fibers obtained by melt spinning glass such as E glass, C glass, A glass, S glass, and alkali-resistant glass, which are ordinarily supplied, are used, but in the present invention, E glass is preferably contained.

The cross section of the continuous reinforcing fibers may be either circular or non-circular.

The form of the continuous reinforcing fibers is not particularly limited, and the continuous reinforcing fibers need only be arranged in parallel in at least one direction, and are preferably arranged in parallel in only one direction. The matter of being arranged in parallel in at least one direction includes, for example, a form having warp threads and weft threads such as fabrics. Examples of the fabric include glass cloth and the like. A state in which the fibers are arranged in parallel in only one direction refers to a state in which continuous reinforcing fiber rovings are opened.

If the continuous reinforcing fibers are carbon fibers, the tensile strength is preferably 1500 MPa or greater, more preferably 2500 MPa or greater, and even more preferably 3500 MPa or greater. The upper limit is not particularly specified, but a practical upper limit is 8000 MPa or less. If the continuous reinforcing fibers are glass fibers, the tensile strength is preferably 800 MPa or greater, more preferably 1800 MPa or greater, and even more preferably 2800 MPa or greater. The upper limit is not particularly specified, but a practical upper limit is 5000 MPa or less.

The ratio of continuous reinforcing fibers in the fiber-reinforced resin material of the present invention is preferably 30 vol. % or greater, and more preferably 40 vol. % or greater. Additionally, the ratio of continuous reinforcing fibers in the fiber-reinforced resin material of the present invention is preferably 75 vol. % or less, and more preferably 65 vol. % or less.

<Properties of Fiber-Reinforced Resin Material>

The water absorption rate of the fiber-reinforced resin material of the present invention is preferably 2 mass % or less, and more preferably 1 mass % or less. The lower limit is not particularly limited, but is 0 mass % or greater.

The water absorption rate is measured in accordance with a method described in the examples below.

The fiber-reinforced resin material of the present invention preferably has an impregnation ratio of the polyamide resin composition in the continuous reinforcing fibers of 90% or greater, and more preferably 95% or greater. The upper limit is preferably 100%.

The impregnation ratio is measured in accordance with a method described in the examples below.

The thickness of the fiber-reinforced resin material is not particularly limited, but is preferably 50 μm or greater, more preferably 70 μm or greater, even more preferably 90 μm or greater, and still even more preferably 100 μm or greater. The upper limit is preferably 500 μm or less, more preferably 450 μm or less, and even more preferably 400 μm or less.

<Applications of Fiber-Reinforced Resin Material>

The fiber-reinforced resin material of the present invention can be preferably used as a prepreg. Additionally, the fiber-reinforced resin material of the present invention can be preferably used as a uni-directional (UD) tape.

The fiber-reinforced resin material of the present invention may be wound onto a core material during storage, shipping, or the like. That is, the fiber-reinforced resin material of the present invention may also be a wound body having a core material and the fiber-reinforced resin material wound onto the core material.

The fiber-reinforced resin material of the present invention may be processed and molded as is, or a plurality of layers may be stacked, and then processed and molded. That is, the form of the molded article formed from the fiber-reinforced resin material is not particularly defined.

Examples thereof include a method for producing a molded article in which a fiber-reinforced resin material is produced, and then a plurality of the fiber-reinforced resin materials are stacked and heated, and a molded article obtained by the method for producing a molded article. The thickness of the thinnest portion of such a molded article can be appropriately determined according to the application or the like, but can be, for example, from 1 mm to 10 mm.

The fields of application of the fiber-reinforced resin material of the present invention are not particularly limited, and the fiber-reinforced resin material of the present invention can be widely used in applications such as components for automobiles and other such transportation devices, general mechanical components, precision mechanical components, electronic and electrical device components, OA device components, building materials and building-related components, medical devices, leisure sporting goods, gaming devices, medical products, food packaging films and other such daily necessities, and defense and aerospace products.

<Production Process>

Next, the method for producing the fiber-reinforced resin material of the present invention is described.

The method for producing a fiber-reinforced resin material of the present invention includes melt-extruding a polyamide resin composition into a film shape, applying the film-shaped polyamide resin composition to continuous reinforcing fibers arranged in parallel in at least one direction, and impregnating the polyamide resin composition into the continuous reinforcing fibers; and is characterized in that the polyamide resin composition contains a polyamide resin (A) and a polyamide resin (B) other than the polyamide resin (A), and the polyamide resin (A) is constituted from a constituent unit derived from a diamine and a constituent unit derived from a dicarboxylic acid, 70 mol % or greater of the constituent units derived from a diamine are derived from meta-xylylenediamine, and 70 mol % or greater of the constituent units derived from a dicarboxylic acid are derived from adipic acid; and a melt tension measured using a capillograph of the polyamide resin composition during melt-extrusion, under conditions including using a die having a diameter of 1 mm and a length of 10 mm, a cylinder temperature set to a temperature X, a preheating time of 6 minutes, a piston speed of 5 mm/min, and a drawing speed of 100 m/min is 1 mN or greater, and a melt viscosity at the temperature X, a shear rate of 122 $sec^{-1}$, and a holding time of 6 minutes is 250 Pa·s or greater.

More preferable is a method in which the film-shaped polyamide resin composition is applied onto the continuous reinforcing fibers, and the polyamide resin composition is impregnated into the continuous reinforcing fibers using a roll. As the application method, a known method can be adopted, but an intent of the present invention is to include, as the application method, aspects such as expanding, placing, spreading, and suspending the molten and film-shaped polyamide resin composition on the continuous reinforcing fibers.

FIG. 1 is a device configuration diagram that schematically illustrates a production device according to a preferred embodiment for producing the fiber-reinforced resin material of the present invention. In the device according to the present embodiment, continuous reinforcing fibers are fed from a creel 2 and sent to a fiber opening device 3. Here, continuous reinforcing fiber rovings are opened to obtain continuous reinforcing fibers 2a arranged in parallel in one direction. The continuous reinforcing fibers at this time are arranged in parallel in a machine direction (MD). As necessary, the continuous reinforcing fibers 2a may be woven through weft threads oriented in a transverse direction (TD). Further, a glass cloth or the like may also be conveyed and used.

The continuous reinforcing fibers 2a are passed through a hot roll 11 and fed downward to a subsequent hot roll 12. By using hot rolls, impregnation of the polyamide resin composition can be more effectively advanced. However, these rolls may be simple conveyance rolls rather than hot rolls.

Meanwhile, in the device according to the present embodiment, the polyamide resin composition is melt-kneaded and extruded at a predetermined amount into a film shape from an extruder 1. The resin composition supplied at this time is preferably dry blended and melt-extruded as is. Through such a configuration, miscibility of the polyamide resin (A) and the polyamide resin (B) can be suppressed, and characteristics of mutual resins can be easily expressed. In addition, the polyamide resin (A) and the polyamide resin (B) can be easily crystallized without overly increasing the dispersibility.

The polyamide resin composition is extruded from a die 4, and a molten film-shaped polyamide resin composition is applied to the continuous reinforcing fibers 2a. In the present embodiment, the film of the molten polyamide resin composition does not have significant variation in the thickness of the film thereof, and is applied to the continuous reinforcing fibers 2a constituted from continuous reinforcing fibers while maintaining homogeneity. An embodiment of a comparative example includes an aspect in which perforations are formed or deficits are present in the molten film at this time.

Furthermore, a release paper or the like may be supplementally used.

The melt extrusion temperature is preferably greater than or equal to the abovementioned temperature X−20° C., and more preferably greater than or equal to the temperature X−10° C. The upper limit of the melt extrusion temperature is preferably less than or equal to the temperature X+100° C., and more preferably less than or equal to the temperature X+50° C.

The pressure (resin pressure) exerted on the continuous reinforcing fibers of the melt-extruded film-shaped polyamide resin composition when passing through the die 4 is preferably 0.05 MPa or greater, more preferably 0.1 MPa or greater, and even more preferably 0.3 MPa or greater. The upper limit is preferably 3 MPa or less, more preferably 2 MPa or less, and even more preferably 1 MPa or less.

The thickness of the film-shaped polyamide resin composition is not particularly limited, but during melt extrusion, the thickness thereof is preferably 15 µm or greater, more preferably 25 µm or greater, and even more preferably 35 µm or greater. The upper limit is preferably 2 mm or less, and more preferably 1 mm or less.

The continuous reinforcing fibers 2a formed from continuous reinforcing fibers separately supplied toward the hot roll 11, and the molten film-shaped polyamide resin composition come into contact with each other at a lower part of the hot roll 12. Next, the material is sent to a heating unit 13. In these steps (in particular, the step of the hot roll 12), the molten film-shaped polyamide resin composition is impregnated into the continuous reinforcing fibers 2a. In this way, a suitable impregnated state is obtained, and a fiber-reinforced resin material 3a, which is a composite in which the film-shaped polyamide resin composition and the continuous reinforcing fibers 2a are integrated, is obtained.

The temperature of the hot rolls 11, 12 is preferably greater than or equal to the temperature X−20° C., and more preferably greater than or equal to the temperature X−10° C. The upper limit of the melt extrusion temperature is preferably less than or equal to the temperature X+100° C., and more preferably less than or equal to the temperature X+50° C.

Furthermore, the heating temperature of the heating unit 13 is preferably greater than or equal to the temperature X, and more preferably greater than or equal to the temperature X+10° C. The upper limit of the temperature of the hot rolls is preferably less than or equal to the temperature X+100° C., and more preferably less than or equal to the temperature X+80° C.

That is, as a preferred embodiment of the present invention, when the polyamide resin composition is to be melt-extruded into a film shape, the polyamide resin composition is expanded toward the continuous reinforcing fibers, the polyamide resin composition is made to contact the separately supplied continuous reinforcing fibers, and the molten film-shaped polyamide resin composition advances in association with rotation of the roll while being sandwiched between the roll and the continuous reinforcing fibers.

Next, the fiber-reinforced resin material 3a is fed to a cooling unit 14. Here, the fiber-reinforced resin material 3a is cooled, and thereby the state in which the resin composition is impregnated into the continuous reinforcing fibers is fixed.

Furthermore, the cooling temperature of the cooling unit 14 is preferably less than or equal to the temperature X−80° C., and more preferably greater than or equal to the temperature X−100° C. The lower limit of the cooling temperature is preferably the abovementioned temperature of 50° C. or higher, and more preferably the abovementioned temperature of 80° C. or higher.

Next, the fiber-reinforced resin material 3a, which is fixed in the form as described above, is wound onto the core material by a winder 9.

EXAMPLES

The present invention will be described more specifically with reference to examples below. Materials, amounts used, ratios, processing details, processing procedures, and the like described in the following examples can be changed, as appropriate, as long as there is no deviation from the spirit of the present invention. Therefore, the scope of the present invention is not limited to the specific examples described below.

Raw Material

<Low Viscosity MXD6>

MX Nylon #6000 available from Mitsubishi Gas Chemical Co., Inc., melting point of 237° C., melt viscosity of 240 Pa·s, and melt tension is not measurable because the resin runs out.

<High Viscosity MXD6>

MX Nylon S6121 available from Mitsubishi Gas Chemical Co., Inc., melting point of 237° C., melt viscosity of 1900 Pa·s, melt tension of 2 mN

<MP10>

Poly-Meta-Para-Xylylene Sebacamide (MP10)

<<<Synthesis Example of MP10 (M/P Ratio=7:3)>>>

Sebacic acid was heated and dissolved in a reactor in a nitrogen atmosphere, after which, while the contents were stirred, a mixed diamine of a molar ratio of 7:3 of meta-xylylenediamine (available from Mitsubishi Gas Chemical Co., Inc.) and para-xylylenediamine (available from Mitsubishi Gas Chemical Co., Inc.) was gradually added dropwise under pressurization (0.35 MPa) such that the molar ratio of diamine and sebacic acid became approximately 1:1, and while the mixed diamine was gradually added, the temperature was raised to 235° C. After completion of the dropwise addition, the reaction was continued for 60 minutes, and the amount of components having a molecular weight of 1000 or less was adjusted. After completion of the reaction, the contents were removed in the form of strands and pelletized with a pelletizer, and a polyamide resin (MP10, meta-xylylenediamine/para-xylylenediamine (M/P)=7:3) was obtained.

The obtained resin had a melt tension of 6 mN, a melt viscosity of 450 Pa·s, and a melting point of 213° C.

<6I/6T>

G21 polyamide 6I/6T, available from EMS-Chemie AG, melt tension of 16 mN, melt viscosity at 270° C. of 360 Pa·s, amorphous polyamide resin, glass transition temperature of 125° C.

Examples 1 to 3, Comparative Examples 1 and 2

Polyamide resins in the proportions listed in Table 1 (the units of the components in table 1 are parts by mass), and sodium stearate were inserted into an extruder such that the amount of the sodium stearate was 50 mass ppm per 100 parts by mass of the polyamide resin composition.

A fiber-reinforced resin material was produced using the device illustrated in FIG. 1. Specifically, the polyamide resin composition was melt-extruded in a film shape from a die onto the surface of continuous reinforcing fibers. The continuous reinforcing fibers at this time were formed by aligning 10 glass fiber rovings (RS 240 QR-483 available from Nitto Boseki Co., Ltd., yarn count of 2400 g/1000 m), and joining the glass fiber rovings while opening the fibers thereof. The extrusion temperature during melt extrusion was a temperature X, the resin pressure was 0.7 MPa, and the thickness of the film during melt extrusion was 50 m. In addition, the roll temperature was set to the temperature X, the heating unit temperature was 300° C., and the cooling unit temperature was 120° C. After cooling, the fiber-reinforced resin material was wound onto a core material with a winder. The thickness of the obtained fiber-reinforced resin material was 120 μm, and the volume ratio of the continuous reinforcing fibers was 58 vol. %.

Example 4

A fiber-reinforced resin material was obtained in the same manner as Example 1 with the exception that 20 carbon fiber rovings (TR50S12L available from Mitsubishi Chemical Corporation, yarn count of 800 g/1000 m) were used for the continuous reinforcing fibers. The thickness of the obtained fiber-reinforced resin material was 110 μm, and the volume ratio of the continuous reinforcing fibers was 55 vol. %.

<Melt Tension>

Using a capillograph, the melt tension of the polyamide resin composition was measured with a die having a diameter (inner diameter of the capillary die) of 1 mm and a length of 10 mm, at conditions including a cylinder temperature of temperature X, a preheating time of 6 minutes, a piston speed of 5 mm/min, and a drawing speed of 100 m/min.

The melt tension of the polyamide resin composition was measured for samples collected by the following two methods.

As the polyamide resin composition, the polyamide resin composition during melt extrusion was collected, cooled, and then pulverized, and the pulverized product was used (during melt extrusion). Furthermore, the fiber-reinforced resin material after impregnation was dissolved in hexafluoroisopropanol, and the reinforcing fibers were filtered off, after which the filtrate was evaporated and dried with a vacuum dryer, and the polyamide resin composition was collected (solvent extraction).

Using a capillograph, the melt tension of the polyamide resin was measured with a die having a diameter of 1 mm and a length of 10 mm, at conditions including a cylinder temperature of a temperature Y, a preheating time of 6 minutes, a piston speed of 5 mm/min, and a drawing speed of 100 m/min. The polyamide resin was unsealed from a packaged state and used as is.

As the device, a capillograph 1D available from Toyo Seiki Seisaku-sho, Ltd. was used.

The values were expressed in units of mN.

<Melt Viscosity>

The melt viscosity of the polyamide resin composition was measured at a temperature X, a shear rate of 122 sec$^{-1}$, and a holding time of 6 minutes.

The melt viscosity of the polyamide resin composition was measured for samples collected by the following two methods.

As the polyamide resin composition, the polyamide resin composition during melt extrusion was collected, cooled, and then pulverized, and the pulverized product was used (during melt extrusion). Furthermore, the fiber-reinforced resin material after impregnation was dissolved in hexafluoroisopropanol, and the reinforcing fibers were filtered off, after which the filtrate was evaporated and dried with a vacuum dryer, and the polyamide resin composition was collected (solvent extraction).

The melt viscosity of the polyamide resin was measured at a temperature Y, a shear rate of 122 sec$^{-1}$, and a holding time of 6 minutes. The polyamide resin was unsealed from a packaged state and used as is.

A capillograph available from Toyo Seiki Seisaku-sho, Ltd. was used.

The values were expressed in units of Pa·s.

<Film Formability>

The form of the film was visually confirmed when the polyamide resin composition was in a molten form. The results were classified into three levels as follows.

A: Almost no perforations or deficits, or absolutely no perforations or deficits.

B: Perforations of a fist-size or smaller were frequently observed.

C: Large perforations exceeding a fist-size and deficits were frequently observed.

<Impregnability>

The fiber-reinforced resin material was cut out and embedded with an epoxy resin. A cross section perpendicular to the longitudinal direction of the embedded fiber-reinforced resin material was polished, and an image of the cross-sectional surface was captured using an ultra-deep color 3D shape-measuring microscope. In the obtained cross-sectional photograph, a region at which components derived from the polyamide resin composition of the fiber-reinforced resin material were melted and impregnated was selected using the image analysis software ImageJ, and the surface area was measured. The impregnation ratio was expressed as the region in which the components derived from the thermoplastic resin composition were impregnated into the continuous reinforcing fibers divided by the cross-sectional area, that is, the region/cross-sectional area (unit: %). The results were classified into three levels as follows.

As the ultra-deep color 3D shape-measuring microscope, the VK-9500 (controller section)/VK-9510 (measurement section) (available from Keyence Corporation) was used.

A: 95% or greater
B: 90% or greater and less than 95%
C: Less than 90%

<Water Absorption Rate>

Polyamide resins of the proportions shown in Table 1, and sodium stearate were inserted into an injection molding machine such that the amount of the sodium stearate was 50 mass ppm per 100 parts by mass of the polyamide resin composition. The material was injected at the temperature X, and strips measuring 80 (mm)×10 (mm)×4 (mm) were obtained. The obtained strips were immersed in 23° C. distilled water for 20 days, 0.5 g was extracted, and the sample was measured by the Karl Fischer method. The measurement temperature was set to the temperature X−25° C., and the moisture content was quantitatively determined under vaporization conditions for 30 minutes, and thereby the percentage of moisture in the polyamide resin composition was determined, As the Karl Fischer method-based device for measuring trace amounts of moisture, the ZQ-2000 Karl Fischer Titrator available from Hiranuma Sangyo Co., Ltd. was used.

The results were classified into three levels as follows.

A: 1 mass % or less
B: Greater than 1 mass % and 2 mass % or less
C: Greater than 2 mass %

<Mechanical Properties>

Ten plies of the obtained fiber-reinforced resin material were stacked, pressed at a pressure of 3 MPa for 15 minutes at 260° C., and then gradually cooled to 150° C. while maintaining the pressurized state, and a molded article with a thickness of 1 mm was obtained. The molded article was cut to dimensions of 20 mm×150 mm, and the flexural strength was measured at 1 mm/min and 23° C. with a distance between chucks of 32 mm.

The INSTRON 5947 was used to measure the flexural strength.

The results were classified into three levels as follows.

A: 1000 MPa or greater
B: 750 MPa or greater and less than 1000 MPa
C: Less than 750 MPa

TABLE 1

|  |  | Comparative Example 1 | Comparative Example 2 | Example 1 | Example 2 | Example 3 | Example 4 |
|---|---|---|---|---|---|---|---|
| Polyamide resin | Low viscosity MXD6 | 100 | 100 | 100 | 100 | 10 | 100 |
|  | High viscosity MXD6 |  | 10 |  |  |  |  |
|  | MP10 |  |  |  | 10 |  | 10 |
|  | 6I/6T |  |  |  |  | 10 | 100 |
| Continuous reinforcing fiber |  | Glass fiber | Glass fiber | Glass fiber | Glass fiber | Glass fiber | Carbon fiber |
| Melt tension of composition (during melt extrusion) |  | Not measurable | 0.8 | 2 | 5 | 16 | 2 |
| Melt tension of composition (solvent extraction) |  | Not measurable | 0.8 | 2 | 5 | 16 | 2 |
| Melt viscosity of composition (during melt extrusion) |  | 240 | 420 | 270 | 290 | 360 | 270 |

TABLE 1-continued

|  | Comparative Example 1 | Comparative Example 2 | Example 1 | Example 2 | Example 3 | Example 4 |
|---|---|---|---|---|---|---|
| Melt viscosity of composition (solvent extraction) | 240 | 420 | 270 | 290 | 360 | 270 |
| Film formability | C | B | A | A | A | A |
| Impregnability | A | C | A | A | B | A |
| Water absorption rate | B | B | A | C | C | A |
| Mechanical properties | A | A | A | A | B | A |

From the above results, cases in which two types of specific polyamide resins were blended, and the melt tension and melt viscosity of the polyamide resin composition were within a prescribed range (Examples 1 to 4) excelled in film formability and impregnability.

In contrast, in Comparative Example 1, the melt tension was weak and could not be measured.

Furthermore, when the melt tension was outside the range stipulated by the claims (Comparative Example 2), the impregnability was inferior.

REFERENCE SIGNS LIST

1 Extruder
2 Creel
3 Fiber opening device
4 Die
9 Winder
11, 12 Hot roll
13 Heating unit
14 Cooling unit
2a Continuous reinforcing fiber
3a Fiber-reinforced resin material

The invention claimed is:

1. A fiber-reinforced resin material with a film shape in which a polyamide resin composition is impregnated into continuous reinforcing fibers arranged in parallel in at least one direction, wherein
the polyamide resin composition comprises a polyamide resin (A) and a polyamide resin (B) other than the polyamide resin (A), and the polyamide resin (A) is constituted from a constituent unit derived from a diamine and a constituent unit derived from a dicarboxylic acid, 70 mol % or more of the constituent units derived from a diamine are derived from meta-xylylenediamine, and 70 mol % or more of the constituent units derived from a dicarboxylic acid are derived from adipic acid;
a melt tension measured using a capillograph of the polyamide resin composition contained in the fiber-reinforced resin material under conditions including using a die having a diameter of 1 mm and a length of 10 mm, a cylinder temperature set to a temperature X, a preheating time of 6 minutes, a piston speed of 5 mm/min, and a drawing speed of 100 m/min is 1 mN or more, and a melt viscosity at the temperature X, a shear rate of 122 sec$^{-1}$, and a holding time of 6 minutes is 250 Pa's or more;
the temperature X is 20° C. higher than the melting point of the polyamide resin with the highest melting point from among polyamide resins contained in the polyamide resin composition, provided that when at least one of the polyamide resins is an amorphous polyamide resin, the temperature X is the higher of 270° C. or said melting point+20° C.; and
wherein the polyamide resin (B) is constituted from a constituent unit derived from a diamine and a constituent unit derived from a dicarboxylic acid, and of the constituent units derived from a diamine, from 50 mol % to 100 mol % are derived from meta-xylylenediamine and from 0 mol % to 50 mol % are derived from para-xylylenediamine, and 70 mol % or more of the constituent units derived from a dicarboxylic acid are derived from sebacic acid.

2. The fiber-reinforced resin material according to claim 1, wherein the melt viscosity at a temperature Y of the polyamide resin (B), a shear rate of 122 sec$^{-1}$, and a holding time of 6 minutes is from 250 to 800 Pas, and the temperature Y is 20° C. higher than the melting point of the polyamide resin, provided that, when the polyamide resin is an amorphous polyamide resin, then 270° C.

3. The fiber-reinforced resin material according to claim 1, wherein a melt tension measured using a capillograph of the polyamide resin (B) under conditions including using a die having a diameter of 1 mm and a length of 10 mm, a cylinder temperature set to the temperature Y, a preheating time of 6 minutes, a piston speed of 5 mm/min, and a drawing speed of 100 m/min is from 1 to 20 mN, and the temperature Y is 20° C. higher than the melting point of the polyamide resin, provided that, when the polyamide resin is an amorphous polyamide resin, then 270° C.

4. The fiber-reinforced resin material according to claim 1, wherein the continuous reinforcing fibers include glass fibers and/or carbon fibers.

5. The fiber-reinforced resin material according to claim 1, wherein the melt viscosity of the polyamide resin composition is 250 Pa·s or more and 400 Pa·s or less.

6. The fiber-reinforced resin material according to claim 1, wherein the fiber-reinforced resin material is a prepreg.

7. The fiber-reinforced resin material according to claim 1, wherein the fiber-reinforced resin material is a unidirection (UD) tape.

8. The fiber-reinforced resin material according to claim 1, wherein the continuous reinforcing fibers are arranged in parallel in one direction.

9. A wound body comprising a core material and the fiber-reinforced resin material described in claim 1 wound onto the core material.

10. A molded article formed from the fiber-reinforced resin material described in claim 1.

11. A method for producing a fiber-reinforced resin material, the method comprising melt-extruding a polyamide resin composition into a film shape, applying the polyamide resin composition with a film shape to continuous reinforcing fibers arranged in parallel in at least one direction, and impregnating the polyamide resin composition into the continuous reinforcing fibers; wherein
the polyamide resin composition comprises a polyamide resin (A) and a polyamide resin (B) other than the polyamide resin (A), and the polyamide resin (A) is constituted from a constituent unit derived from a diamine and a constituent unit derived from a dicarboxylic acid, 70 mol % or more of the constituent units derived from a diamine are derived from meta-xylylenediamine, and 70 mol % or more of the constituent units derived from a dicarboxylic acid are derived from adipic acid;

a melt tension measured using a capillograph of the polyamide resin composition during melt-extrusion, under conditions including using a die having a diameter of 1 mm and a length of 10 mm, a cylinder temperature set to a temperature X, a preheating time of 6 minutes, a piston speed of 5 mm/min, and a drawing speed of 100 m/min is 1 mN or more, and a melt viscosity at the temperature X, a shear rate of 122 sec$^{-1}$, and a holding time of 6 minutes is 250 Pa·s or more;

the temperature X is 20° C. higher than the melting point of the polyamide resin with the highest melting point from among polyamide resins contained in the polyamide resin composition, provided that when at least one of the polyamide resins is an amorphous polyamide resin, the temperature X is the higher of 270° C. or said melting point+20° C.; and wherein the polyamide resin (B) is constituted from a constituent unit derived from a diamine and a constituent unit derived from a dicarboxylic acid, and of the constituent units derived from a diamine, from 50 mol % to 100 mol % are derived from meta-xylylenediamine and from 0 mol % to 50 mol % are derived from para-xylylenediamine, and 70 mol % or more of the constituent units derived from a dicarboxylic acid are derived from sebacic acid.

12. The method for producing a fiber-reinforced resin material according to claim 11, wherein the continuous reinforcing fibers are arranged in parallel in one direction.

13. The method for producing a fiber-reinforced resin material according to claim 12, wherein the continuous reinforcing fibers arranged in parallel in one direction are opened continuous reinforcing fiber rovings.

14. The method for producing a fiber-reinforced resin material according to claim 11, the method comprising applying the polyamide resin composition with a film shape onto the continuous reinforcing fibers and impregnating the polyamide resin composition into the continuous reinforcing fibers using a roll.

15. The method for producing a fiber-reinforced resin material according to claim 11, wherein the melt viscosity of the polyamide resin composition is 250 Pa·s or more and 400 Pa·s or less.

* * * * *